United States Patent
Mannebach et al.

(10) Patent No.: US 9,932,465 B1
(45) Date of Patent: Apr. 3, 2018

(54) POLYMERIZATION PROCESS IN THE PRESENCE OF ANTISTATIC AGENT

(71) Applicant: Basell Polyolefine GmbH, Wesseling (DE)

(72) Inventors: Gerd Mannebach, Muenstermaifeld (DE); Bernd Lothar Marczinke, Roemerberg (DE); Gerhardus Meier, Frankfurt (DE); Ulf Schueller, Weiterstadt (DE); Shahram Mihan, Bad Soden (DE); Andreas Maus, Frankfurt (DE); Pietro Baita, Ferrara (IT); Maria Di Diego, Ferrara (IT); Lorella Marturano, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/560,424

(22) PCT Filed: Mar. 23, 2016

(86) PCT No.: PCT/EP2016/056340
§ 371 (c)(1),
(2) Date: Sep. 21, 2017

(87) PCT Pub. No.: WO2016/150997
PCT Pub. Date: Sep. 29, 2016

(30) Foreign Application Priority Data

Mar. 26, 2015 (EP) .................................... 15161098
Dec. 15, 2015 (EP) .................................... 15200102

(51) Int. Cl.
*C08F 2/44* (2006.01)
*C08F 2/38* (2006.01)
(Continued)

(52) U.S. Cl.
CPC ................. *C08L 23/06* (2013.01); *C08F 2/34* (2013.01); *C08F 2/44* (2013.01); *C08F 10/02* (2013.01);
(Continued)

(58) Field of Classification Search
CPC ..... C08F 2/38; C08F 2/44; C08F 10/02; C08J 5/0075
(Continued)

(56) References Cited

U.S. PATENT DOCUMENTS 5,346,959 A 9/1994 Goman et al.
7,282,544 B2 10/2007 Miserque et al.
(Continued)

FOREIGN PATENT DOCUMENTS

EP 0107127 A1 5/1984
EP 0229368 A2 7/1987
(Continued)

OTHER PUBLICATIONS

The International Search Report and Written Opinion for PCT/EP2016/056340 dated Aug. 11, 2016.
(Continued)

*Primary Examiner* — Fred M Teskin (57) ABSTRACT

A process for preparing a polyolefin, including polymerizing olefins in the presence of an antistatic agent made from or containing an alkylene oxide derived polymer made from or containing in average from about 10 to about 200 repeating units —($CH_2$—CHR—O)— with R being hydrogen or an alkyl group having from 1 to 6 carbon atoms, wherein the alkylene oxide derived polymer is a random copolymer of ethylene oxide and other alkylene oxides and a ratio of n:m is in the range of from 6:1 to 1:1, wherein (n) is the average number of repeating units —($CH_2$—$CH_2$—O)— derived from ethylene oxide and (m) is the average number of
(Continued)

repeating units —(CH$_2$—CHR'—O)— derived from the other alkylene oxides with R' being an alkyl group having from 1 to 6 carbon atoms, and the end groups of the alkylene oxide derived polymer are —OH groups.

20 Claims, 1 Drawing Sheet

(51) Int. Cl.
| | |
|---|---|
| C08F 10/02 | (2006.01) |
| C08F 210/16 | (2006.01) |
| C08L 23/06 | (2006.01) |
| C08L 71/02 | (2006.01) |
| C08K 5/00 | (2006.01) |
| C08F 2/34 | (2006.01) |
| B01J 8/24 | (2006.01) |
| B01J 8/22 | (2006.01) |

(52) U.S. Cl.
CPC .......... *C08F 210/16* (2013.01); *C08K 5/0075* (2013.01); *C08L 71/02* (2013.01); *B01J 8/224* (2013.01); *B01J 8/24* (2013.01); *C08F 2500/04* (2013.01); *C08F 2500/07* (2013.01); *C08F 2500/12* (2013.01)

(58) Field of Classification Search
USPC ............................................. 526/74; 528/484
See application file for complete search history.

(56) References Cited

U.S. PATENT DOCUMENTS

| | | | |
|---|---|---|---|
| 8,916,657 B2 * | 12/2014 | Siraux | ........................ B01J 8/10 526/348 |
| 9,023,945 B2 | 5/2015 | Mavridis et al. | |
| 9,771,439 B2 | 9/2017 | Mihan et al. | |
| 2007/0049709 A1 * | 3/2007 | Miserque | .............. C08F 110/06 526/64 |
| 2016/0130376 A1 | 5/2016 | Mihan et al. | |

FOREIGN PATENT DOCUMENTS

| | | |
|---|---|---|
| EP | 0555197 A2 | 8/1993 |
| EP | 2813520 A1 | 12/2014 |
| JP | S5964604 A | 4/1984 |
| JP | S63175009 A | 7/1988 |
| JP | 2008511687 A | 4/2008 |
| JP | 2009292964 A | 12/2009 |
| WO | WO-2014134193 A1 | 9/2014 |
| WO | 2014198693 A1 | 12/2014 |

OTHER PUBLICATIONS

Burckhardt Pumpability Certification for Clariant PE-K 270, 2011, https://www.clariant.com/en/Solutions/Products/2015/08/27/15/27/Polyglykol-PEK-270, 2 pages.

* cited by examiner

POLYMERIZATION PROCESS IN THE PRESENCE OF ANTISTATIC AGENT

FIELD OF THE INVENTION

This application is the U.S. National Phase of PCT International Application PCT/EP2016/056340, filed Mar. 23, 2016, claiming the benefit of priority to European Patent Application No. 15161098.7, filed Mar. 26, 2015, and European Patent Application No. 15200102.0, filed Dec. 15, 2015, the disclosures of which are incorporated herein by reference in their entirety.

In general, the present disclosure relates to the field of chemistry. More specifically, the present disclosure relates to polymer chemistry. In particular, the present disclosure relates to a process for the preparation of a polyolefin by polymerizing olefins at temperatures of from about 20 to about 200° C. and pressures of from about 0.1 to about 20 MPa in the presence of a polymerization catalyst and an antistatic agent in a polymerization reactor.

BACKGROUND OF THE INVENTION

In the context of olefin polymerization, antistatic agents are also called antifouling agents, activity inhibitors, productivity inhibitors or kinetic modifiers. Antistatic agents can include antistatically acting compounds which have polar functional groups such as acid or ester groups, amine or amide groups or hydroxyl or ether groups. Examples of antistatically acting compounds are polysulfone copolymers, polymeric polyamines, polyalcohols, hydroxyesters of polyalcohols, salts of alkylarylsulfonic acids, polysiloxanes, alkoxyamines, and polyglycol ethers.

Antistatic agents used in the continuous polymerization of olefins can negatively impact the activity of polymerization catalysts and have limited efficiency. There can be issues regarding sheeting and lump formation, including for preparing polyolefins with relatively high molecular weight.

SUMMARY OF THE INVENTION

In a general embodiment, the present disclosure provides a process for the preparation of a polyolefin including polymerizing olefins at temperatures of from about 20 to about 200° C. and pressures of from about 0.1 to about 20 MPa in the presence of a polymerization catalyst in a polymerization reactor, wherein the polymerization is carried out in the presence of an antistatic agent made from or containing an alkylene oxide derived polymer made from or containing in average from about 10 to about 200 repeating units —(CH$_2$—CHR—O)— with R being hydrogen or an alkyl group having from 1 to 6 carbon atoms, wherein the alkylene oxide derived polymer is a random copolymer of ethylene oxide and other alkylene oxides and a ratio of n:m is in the range of from 6:1 to 1:1, wherein (n) is the average number of repeating units —(CH$_2$—CH$_2$—O)— derived from ethylene oxide and (m) is the average number of repeating units —(CH$_2$—CHR'—O)— derived from the other alkylene oxides with R' being an alkyl group having from 1 to 6 carbon atoms, and the end groups of the alkylene oxide derived polymer are —OH groups.

In some embodiments, the ratio of n:m is in the range of from 4:1 to 2:1.

In some embodiments, the random copolymer the alkylene oxide derived polymer is a linear polymer of general formula (I)

HO—(CH$_2$—CH$_2$—O)$_n$—(CH$_2$—CHR'—O)$_m$—H (I)

wherein R' is a alkyl group having from 1 to 6 carbon atoms and n is in a range of from 10 to 180 and m is in a range of from 2 to 120.

In some embodiments, the random copolymer is a random copolymer of ethylene oxide and propylene oxide.

In some embodiments, the ethylene oxide/propylene oxide polymer is a linear ethylene oxide/propylene oxide copolymer of general formula (II)

HO—(CH$_2$—CH$_2$—O)$_n$—(CH$_2$—CH(CH$_3$)—O)$_m$—H (II)

wherein n is in a range of from 10 to 180 and m is in a range of from 2 to 120.

In some embodiments, the polymerization is carried out in a polymerization reactor cascade including a fluidized-bed reactor and a multizone circulating reactor, wherein in the multizone circulating reactor, the growing polymer particles flow upward through a first polymerization zone under fast fluidization or transport conditions (a riser), leave the first polymerization zone and enter a second polymerization zone through which the particles flow downward under the action of gravity (a downcomer), leave the downcomer and are reintroduced into the riser, thereby establishing a circulation of polymer, In some embodiments, the fluidized-bed reactor is arranged upstream of the multizone circulating reactor.

In some embodiments, a lower molecular weight polyolefin polymer component is obtained in the fluidized-bed reactor and a higher molecular weight polyolefin polymer component is obtained in the multizone circulating reactor.

In some embodiments, the polyolefin is a multimodal polyolefin.

In some embodiments, the polyolefin is a polyethylene prepared by homopolymerizing ethylene or copolymerizing ethylene and up to about 20 wt. % of C$_3$-C$_8$-1-alkenes, based upon the total weight of the polyethylene.

In some embodiments, the polyethylene has a MFR$_{21.6}$ according to DIN EN ISO 1133:2005 at a temperature of 190° C. under a load of 21.6 kg in the range of from about 0.5 g/10 min to about 350 g/10 min.

In some embodiments, the polyethylene has a density in the range of from about 0.935 g/cm$^3$ to about 0.970 g/cm$^3$.

In some embodiments, the polyethylene is prepared in a polymerization reactor cascade including a fluidized-bed reactor and a multizone circulating reactor, in which the fluidized-bed reactor is arranged upstream of the multizone circulating reactor, and an ethylene homopolymer or ethylene copolymer, having a MFR$_{2.16}$ according to DIN EN ISO 1133:2005 at a temperature of 190° C. under a load of 2.16 kg in the range of from about 0.1 g/10 min to about 300 g/10 min, is produced in the fluidized-bed reactor.

In some embodiments, the polymerization catalyst is selected from the group consisting of a Ziegler catalyst, a Ziegler-Natta catalyst, a Phillips catalyst, a single-site catalyst and a mixture of catalysts made from or containing a single-site catalyst.

DETAILED DESCRIPTION OF THE INVENTION

In a general embodiment, the present disclosure provides a process for the polymerization of olefins. In some embodiments, the olefins are 1-olefins. In some embodiments, the olefins are hydrocarbons having terminal double bonds. In some embodiments, the polymerizable monomers are functionalized olefinically unsaturated compounds. In some embodiments, the monomers are ester or amide derivatives of acrylic or methacrylic acid, including acrylates, methacrylates, or acrylonitrile. In some embodiments, the olefins are nonpolar olefinic compounds, including aryl-substituted 1-olefins. In some embodiments, the olefins are 1-olefins selected from the group consisting of linear or branched $C_2$-$C_{12}$-1-alkenes. In some embodiments, the olefins are 1-olefins selected from the group consisting of linear $C_2$-$C_{10}$-1-alkenes (including ethylene, propylene, 1-butene, 1-pentene, 1-hexene, 1-heptene, 1-octene, and 1-decene), branched $C_2$-$C_{10}$-1-alkenes (including 4-methyl-1-pentene), conjugated and nonconjugated dienes (including 1,3-butadiene, 1,4-hexadiene and 1,7-octadiene), and vinylaromatic compounds (including styrene or substituted styrene). In some embodiments, the olefins are mixtures of various 1-olefins. In some embodiments, the olefins have the double bond as part of a cyclic structure which can have one or more ring systems. In some embodiments, the olefins are selected from the group consisting of cyclopentene, norbornene, tetracyclododecene and methylnorbornene. In some embodiments, the olefins are dienes selected from the group consisting of 5-ethylidene-2-norbornene, norbornadiene and ethylnorbomadiene. In some embodiments, the olefins are mixtures of two or more olefins.

In some embodiments, the process is used in the homopolymerization or copolymerization of ethylene or propylene. In some embodiments, the process is used for the homopolymerization or copolymerization of ethylene. In some embodiments, the comonomers in propylene polymerization are up to about 40 wt. % of ethylene and/or 1-butene, based upon the total weight of the monomers, alternatively from about 0.5 wt. % to about 35 wt. % of ethylene and/or 1-butene. In some embodiments, comonomers in ethylene polymerization are used in amounts up to about 20 wt. %, based upon the total weight of the monomers, alternatively from about 0.01 wt. % to about 15 wt. %. In some embodiments, the comonomers are used in an amount from about 0.05 wt. % to about 12 wt. %. In some embodiments, the comonomers are selected from $C_3$-$C_8$-1-alkenes, alternatively, selected from the group consisting of 1-butene, 1-pentene, 1-hexene and 1-octene. In some embodiments, the process involves ethylene copolymerized with from about 0.1 wt. % to about 12 wt. % of 1-hexene and/or 1-butene, based upon the total weight of the monomers.

In some embodiments, the process is for the preparation of polyethylenes having a MFR$_{21.6}$ at a temperature of 190° C. under a load of 21.6 kg, determined according to DIN EN ISO 1133:2005, condition G, of from about 0.5 to about 300 g/10 min, alternatively from about 1 to about 100 g/10 min, alternatively from about 1.2 to about 100 g/10 min and alternatively from about 1.5 to about 50 g/10 min.

In some embodiments, the polymerization of olefins is carried out using Phillips catalysts based on chromium oxide, titanium-based Ziegler- or Ziegler-Natta-catalysts, or single-site catalysts. In some embodiments, single-site catalysts are based on chemically uniform transition metal coordination compounds. In some embodiments, mixtures of two or more of these catalysts are used for the polymerization of olefins. In some embodiments, the mixed catalysts are designated as hybrid catalysts.

In some embodiments, the catalysts for the process are of the Phillips type. In some embodiments, the Phillips-type catalysts are prepared by applying a chromium compound to an inorganic support and subsequently calcinating at temperatures in the range from about 350 to about 950° C., resulting in chromium present in valences lower than six being converted into the hexavalent state. In some embodiments apart from chromium, further elements such as magnesium, calcium, boron, aluminum, phosphorus, titanium, vanadium, zirconium or zinc are used. In some embodiments, the further elements are titanium, zirconium or zinc. In some embodiments, combinations of the elements are used. In some embodiments, the catalyst precursor is doped with fluoride prior to or during calcination. In some embodiments, supports for Phillips catalysts are selected from the group consisting of aluminum oxide, silicon dioxide (silica gel), titanium dioxide, zirconium dioxide or their mixed oxides or cogels, or aluminum phosphate. In some embodiments, support materials are obtained by modifying the pore surface area. In some embodiments, the pore surface area is modified by compounds of the elements boron, aluminum, silicon or phosphorus. In some embodiments, the pore-surface-area-modifying compound is a silica gel. In some embodiments, the silica gel is a spherical or granular silica gel. In some embodiments, the spherical silica gel is able to be spray dried. In some embodiments, the activated chromium catalysts is subsequently prepolymerized or prereduced. In some embodiments, the prereduction is carried out by cobalt or hydrogen at about 250 to about 500° C., alternatively at about 300 to about 400° C., in an activator.

In some embodiments, the catalysts for the process are single-site catalysts. In some embodiments, the single-site catalysts are bulky sigma- or pi-bonded organic ligands. In some embodiments, the catalysts selected from the group consisting of catalysts based on mono-Cp complexes, catalysts based on bis-Cp complexes and catalysts based on late transition metal complexes. In some embodiments, the catalysts are based on iron-bisimine complexes. In some embodiments, the catalysts are mixtures of two or more single-site catalysts or mixtures of different types of catalysts made from or containing a single-site catalyst.

In some embodiments, the catalysts are Ziegler type catalysts. In some embodiments, the Ziegler-type catalysts are made from or contain a compound of titanium or vanadium, a compound of magnesium and optionally an electron donor compound and/or a particulate inorganic oxide as support.

In some embodiments, titanium compounds are made of the halides or alkoxides of trivalent or tetravalent titanium. In some embodiments, the titanium compounds are made with titanium alkoxy halogen compounds or mixtures of various titanium compounds. In some embodiments, the titanium compounds are selected from the group consisting of $TiBr_3$, $TiBr_4$, $TiCl_3$, $TiCl_4$, $Ti(OCH_3)Cl_3$, $Ti(OC_2H_5)Cl_3$, $Ti(O\text{-}i\text{-}C_3H_7)Cl_3$, $Ti(O\text{-}n\text{-}C_4H_9)C_{13}$, $Ti(OC_2H_5)Br_3$, $Ti(O\text{-}n\text{-}C_4H_9)Br_3$, $Ti(OCH_3)_2Cl_2$, $Ti(OC_2H_5)_2Cl_2$, $Ti(O\text{-}n\text{-}C_4H_9)_2Cl_2$, $Ti(OC_2H_5)_2Br_2$, $Ti(OCH_3)_3Cl$, $Ti(OC_2H_5)_3Cl$, $Ti(O\text{-}n\text{-}C_4H_9)_3Cl$, $Ti(OC_2H_5)_3Br$, $Ti(OCH_3)_4$, $Ti(OC_2H_5)_4$ and $Ti(O\text{-}n\text{-}C_4H_9)_4$. In some embodiments, the titanium compounds are made from or contain chlorine as the halogen. In some embodiments, the titanium halides do not contain components other than halogens and titanium. In some embodiments, the titanium halides are titanium chlorides. In some embodiments, the titanium halides are titanium tetrachloride. In some embodiments, vanadium compounds are made from or containing vanadium halides, vanadium oxyhalides, vanadium alkoxides and vanadium acetylacetonates. In some embodiments, the vanadium compounds have oxidation states 3 to 5.

In some embodiments, in the production of the solid component, at least one compound of magnesium is used. In some embodiments, the magnesium compounds are made from or contain halogens. In some embodiments, the magnesium compound is a magnesium halide. In some embodiment, the halides is selected from the group consisting of chlorides or bromides. In some embodiments, the magnesium halides are prepared by reaction with halogenating agents. In some embodiments, the halogens are selected from the group consisting of chlorine, bromine, iodine, fluorine, and mixtures of two or more halogens. In some embodiments, the halogens are selected from the group consisting of chlorine and bromine. In some embodiments, the halogen is chlorine.

In some embodiments, the magnesium compound is selected from the group consisting of magnesium chlorides and magnesium bromides. In some embodiments, the magnesium compounds from which the halides can be obtained are selected from the group consisting of magnesium alkyls, magnesium aryls, magnesium alkoxy compounds, magnesium aryloxy compounds and Grignard compounds. In some embodiments, the halogenating agents are halogens, hydrogen halides, $SiCl_4$ or $CCl_4$. In some embodiments, the halogenating agent is chlorine or hydrogen chloride.

In some embodiments, halogen-free compounds of magnesium are selected from the group consisting of diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In some embodiments, the halogen-free compounds of magnesium is n-butylethylmagnesium or n-butyloctylmagnesium.

In some embodiments, the magnesium compound is a Grignard compound selected from the group consisting of methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

In some embodiments, the magnesium compounds for producing the particulate solids is selected from the group consisting of magnesium dichloride, magnesium dibromide, and the di($C_1$-$C_{10}$-alkyl)magnesium compounds. In some embodiments, the magnesium compounds for producing the particulate solids is a di($C_1$-$C_{10}$-alkyl)magnesium compound. In some embodiments, the Ziegler-Natta catalyst is made from or contains a transition metal selected from titanium, zirconium, vanadium, and chromium.

In some embodiments, the electron donor compounds for preparing Ziegler type catalysts are selected from the group consisting of alcohols, glycols, esters, ketones, amines, amides, nitriles, alkoxysilanes and aliphatic ethers. These electron donor compounds can be used alone or in mixtures with other electron donor compounds.

In some embodiments, the electron donor compound is an alcohol having the formula $R^1OH$ in which the $R^1$ group is a $C_1$-$C_{20}$ hydrocarbon group. In some embodiments, $R^1$ is a $C_1$-$C_{10}$ alkyl group. In some embodiments, the alcohol is selected from the group consisting of methanol, ethanol, iso-propanol and n-butanol. In some embodiments, the electron donor compound is a glycol having a total number of carbon atoms lower than 50. In some embodiments, the glycol is a 1,2 or 1,3 glycol having a total number of carbon atoms lower than 25. In some embodiments, the glycol is selected from the group consisting of ethylenglycol, 1,2-propylenglycol and 1,3-propylenglycol. In some embodiments, the electron donor compound is an ester selected from the group consisting of alkyl esters of $C_1$-$C_{20}$ aliphatic carboxylic acids. In some embodiments, the ester is selected from the group consisting of $C_1$-$C_8$ alkyl esters of aliphatic mono carboxylic acids. In some embodiments, the ester is selected from the group consisting of ethylacetate, methylformiate, ethylformiate, methylacetate, propylacetate, i-propylacetate, n-butylacetate, and i-butylacetate. In some embodiments, the electron donor compound is an amine having the formula $NR^2_3$ in which the $R^2$ groups are, independently, hydrogen or a $C_1$-$C_{20}$ hydrocarbon group with the proviso that the $R^2$ groups are not simultaneously hydrogen. In some embodiments, $R^2$ is a $C_1$-$C_{10}$ alkyl group. In some embodiments, the amine is selected from the group consisting of diethylamine, diisopropylamine and triethylamine. In some embodiments, the electron donor compound is an amide having the formula $R^3CONR^4_2$ in which $R^3$ and $R^4$ are, independently, hydrogen or a $C_1$-$C_{20}$ hydrocarbon group. In some embodiments, the amide is selected from the group consisting of formamide and acetamide. In some embodiments, the electron donor compound is a nitrile having the formula $R^1CN$ where $R^1$ has the same meaning given above. In some embodiments, the nitrile is acetonitrile. In some embodiments, the electron donor compound is an alkoxysilane having the formula $R^5_aR^6_bSi(OR^7)_c$, where a and b are integer from 0 to 2, c is an integer from 1 to 4 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds have a is 0 or 1, c is 2 or 3, $R^6$ is an alkyl or cycloalkyl group, optionally containing heteroatoms, and $R^7$ is methyl. In some embodiments, the silicon compound is selected from the group consisting of methyltrimethoxysilane, dimethyldimethoxysilane, trimethylmethoxysilane and t-butyltrimethoxysilane.

In some embodiments, the electron donor compounds are selected from the group consisting of amides, esters, and alkoxysilanes.

In some embodiments, catalysts of the Ziegler type are polymerized in the presence of a cocatalyst. In some embodiments, the cocatalysts are organometallic compounds of metals of groups 1, 2, 12, 13 or 14 of the Periodic Table of Elements. In some embodiments, the cocatalysts are organometallic compounds of metals of group 13. In some embodiments, the cocatalysts are organoaluminum compounds. In some embodiments, the cocatalysts are selected from the group consisting of organometallic alkyls, organometallic alkoxides, and organometallic halides.

In some embodiments, the organometallic compounds are made from or contain lithium alkyls, magnesium or zinc alkyls, magnesium alkyl halides, aluminum alkyls, silicon alkyls, silicon alkoxides and silicon alkyl halides. In some embodiments, the organometallic compounds are made from or contain aluminum alkyls and magnesium alkyls. In some embodiments, the organometallic compounds are made from or contain aluminum alkyls. In some embodiments, the organometallic compounds are trialkylaluminum compounds. In some embodiments, the aluminum alkyls are made from or contain trimethylaluminum, triethylaluminum, tri-isobutylaluminum, tri-n-hexylaluminum and the like.

In some embodiments, the polyolefin particles have a more or less regular morphology and size, depending on the catalyst morphology and size, and on polymerization conditions. In some embodiments and depending on the catalyst used, the polyolefin particles have a mean diameter of from a few hundred to a few thousand micrometers. In some embodiments and in the case of chromium catalysts, the mean particle diameter is from about 300 to about 1600 µm. In some embodiments and in the case of Ziegler type catalysts, the mean particle diameter is from about 500 to about 3000 µm.

In some embodiments, the process is carried out using low-pressure polymerization methods at temperatures in the range from about 20 to about 200° C., alternatively from about 30 to about 150° C. and alternatively from about 40 to about 130° C., and under pressures of from about 0.1 to about 20 MPa and alternatively from about 0.3 to about 5 MPa. In some embodiments, the polymerization is carried out batchwise. In some embodiments, the polymerization is carried out continuously in one or more stages. In some embodiments, the process is selected from the group consisting of solution processes, suspension processes, and gas-phase processes. In some embodiments, the process using gas-phase fluidized-bed reactors or multizone circulating reactors. In some embodiments, the suspension polymerization process uses loop reactors or stirred tank reactors.

In some embodiments, the polymerization process is a suspension polymerization in a suspension medium. In some embodiments, the medium is an inert hydrocarbon such as isobutane or mixtures of hydrocarbons or the monomers themselves. In some embodiments, the suspension polymerization temperatures are in the range from about 20 to about 115° C., and the pressure is in the range of from about 0.1 to about 10 MPa. In some embodiments, the solids content of the suspension is in the range of from about 10 to about 80 wt. %. In some embodiments, the polymerization is carried out batchwise, such as in stirred autoclaves. In some embodiments, the polymerization is carried out continuously, such as in tubular reactors. In some embodiments, the reactors are loop reactors. In some embodiments, the polymerization is carried out by the Phillips PF process as described in U.S. Pat. No. 3,242,150 and U.S. Pat. No. 3,248,179, incorporated herein by reference.

The suspension medium should be inert and be liquid or supercritical under the reaction conditions and should have a boiling point which is different from those of the monomers and comonomers used in order to make it possible for these starting materials to be recovered from the product mixture by distillation. In some embodiments, the suspension media are saturated hydrocarbons having from 4 to 12 carbon atoms. In some embodiments, the suspension media are selected from the group consisting of isobutane, butane, propane, isopentane, pentane and hexane, or a mixture of these. In some embodiments, the suspension media is diesel oil.

In some embodiments, the polymerization takes place in a cascade of two, alternatively three or four, stirred vessels. In some embodiments, the molecular weight of the polymer fraction prepared in each of the reactors is set by addition of hydrogen to the reaction mixture. In some embodiments, the polymerization process is carried out with the highest hydrogen concentration and the lowest comonomer concentration, based on the amount of monomer, being set in the first reactor. In the subsequent further reactors, the hydrogen concentration is gradually reduced and the comonomer concentration is altered, in each case once again based on the amount of monomer. In some embodiments, ethylene or propylene is used as monomer and a 1-olefin having from 4 to 10 carbon atoms is used as comonomer.

In some embodiments, the polymerization process is suspension polymerization in loop reactors, where the polymerization mixture is pumped continuously through a cyclic reactor tube. As a result of the pumped circulation, continual mixing of the reaction mixture is achieved and the catalyst introduced and the monomers fed in are distributed in the reaction mixture. Furthermore, the pumped circulation prevents sedimentation of the suspended polymer. The removal of the heat of reaction via the reactor wall is also promoted by the pumped circulation. In some embodiments, these reactors consist of a cyclic reactor tube having one or more ascending legs and one or more descending legs which are enclosed by cooling jackets for removal of the heat of reaction and also horizontal tube sections which connect the vertical legs. In some embodiments, the impeller pump, the catalyst feed facilities and the monomer feed facilities and also the discharge facility, thus the settling legs, are installed in the lower tube section. In some embodiments, the reactor has more than two vertical tube sections, thereby obtaining a meandering arrangement.

In some embodiments, the suspension polymerization is carried out in the loop reactor at an ethylene concentration of at least 5 mole percent, alternatively 10 mole percent, based on the suspension medium. As used herein, the term "suspension medium" means the mixture of the fed suspension medium with the monomers dissolved therein, rather than the fed suspension medium alone.

In some embodiments, the polymerization process is carried out as gas-phase polymerization, which can be described as a process in which the solid polymers are obtained from a gas-phase of the monomer or the monomers. In some embodiments, the gas-phase polymerizations are carried out at pressures of from about 0.1 to about 20 MPa, alternatively from about 0.5 to about 10 MPa and alternatively from about 1.0 to about 5 MPa and polymerization temperatures from about 40 to about 150° C. and alternatively from about 65 to about 125° C.

In some embodiments, the gas-phase polymerization reactors are selected from horizontally or vertically stirred reactor, fluidized bed gas-phase reactors and multizone circulating reactors. In some embodiments, the gas-phase polymerization reactors are selected from fluidized bed gas-phase reactors and multizone circulating reactors.

In some embodiments, fluidized-bed polymerization reactors are reactors in which the polymerization takes place in a bed of polymer particles which is maintained in a fluidized state by feeding in gas at the lower end of a reactor, below a gas distribution grid having the function of dispensing the gas flow, and taking off the gas again at its upper end. The reactor gas is then returned to the lower end to the reactor via a recycle line equipped with a compressor and a heat exchanger. In some embodiments, the circulated reactor gas is a mixture of the olefins to be polymerized, inert gases and/or lower alkanes and optionally a molecular weight regulator. In some embodiments, the inert gas is nitrogen. In some embodiments, the lower alkanes are selected from the group consisting of ethane, propane, butane, pentane or hexane. In some embodiments, the use of nitrogen or propane as inert gas is in combination with further lower alkanes. In some embodiments, the molecular weight regulator is hydrogen. In some embodiments, the velocity of the reactor gas fluidizes the mixed bed of finely divided polymer in the tube serving as polymerization zone and removes the heat of polymerization. In some embodiments, the polymerization is carried out in a condensed or super-condensed mode, in which part of the circulating reaction gas is cooled to below the dew point and returned to the reactor separately as a liquid and a gas-phase or together as a two-phase mixture in order to make additional use of the enthalpy of vaporization for cooling the reaction gas.

Multizone circulating reactors are gas-phase reactors in which two polymerization zones are linked to one another and the polymer is passed alternately a plurality of times through these two zones. In some embodiments, the reactors are as described in Patent Cooperation Treaty Publication No. WO 97/04015 A1 and Patent Cooperation Treaty Publication No. WO 00/02929 A1, incorporated herein by reference. In some embodiments, the reactors have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer and the polymer particles leaving the downcomer are reintroduced into the riser, thus establishing a circulation of polymer between the two polymerization zones and the polymer is passed alternately a plurality of times through these two zones. In some embodiments, the process involves operating the two polymerization zones of one multizone circulating reactor with different polymerization conditions by establishing different polymerization conditions in its riser and its downcomer. In some embodiments, the gas mixture leaving the riser and entraining the polymer particles can be partially or totally prevented from entering the downcomer. In some embodiments, a barrier fluid in form of a gas and/or a liquid mixture is fed into the downcomer. In some embodiments, the feed is in the upper part of the downcomer. In some embodiments, the barrier fluid has a composition different from that of the gas mixture present in the riser. In some embodiments, the amount of added barrier fluid can be adjusted such that an upward flow of gas countercurrent to the flow of the polymer particles is generated. In some embodiments, the flow is affected at the top thereof. In some embodiments, a barrier to the gas mixture entrained among the particles coming from the riser occurs. In some embodiments, two different gas composition zones in one multizone circulating reactor result. In some embodiments, make-up monomers, comonomers, molecular weight regulator and/or inert fluids are introduced at any point of the downcomer. In some embodiments, the introduction occurs below the barrier feeding point. In some embodiments, varying monomer, comonomer and hydrogen concentrations along the downcomer can affect the polymerization conditions.

In some embodiments, the gas-phase polymerization processes are carried out in the presence of a $C_3$-$C_5$ alkane as polymerization diluent, alternatively in the presence of propane. In some embodiments, the modified processes are used in the case of homopolymerization or copolymerization of ethylene.

In some embodiments, polymerization processes can be connected in series and thus form a polymerization cascade. In some embodiments, a parallel arrangement of reactors using two or more different or identical processes is used.

In some embodiments, the polymerization of olefins is carried out in a reactor cascade of two or more gas-phase reactors. In some embodiments, the polymerization of olefins is carried out in a reactor cascade including a fluidized-bed reactor and a multizone circulating reactor. In some embodiments, a fluidized-bed reactor is arranged upstream of a multizone circulating reactor. In some embodiments, a reactor cascade of gas-phase reactors includes additional polymerization reactors. In some embodiments, these additional reactors are low-pressure polymerization reactors such as gas-phase reactors or suspension reactors and may also include a pre-polymerization stage.

Figure 1:
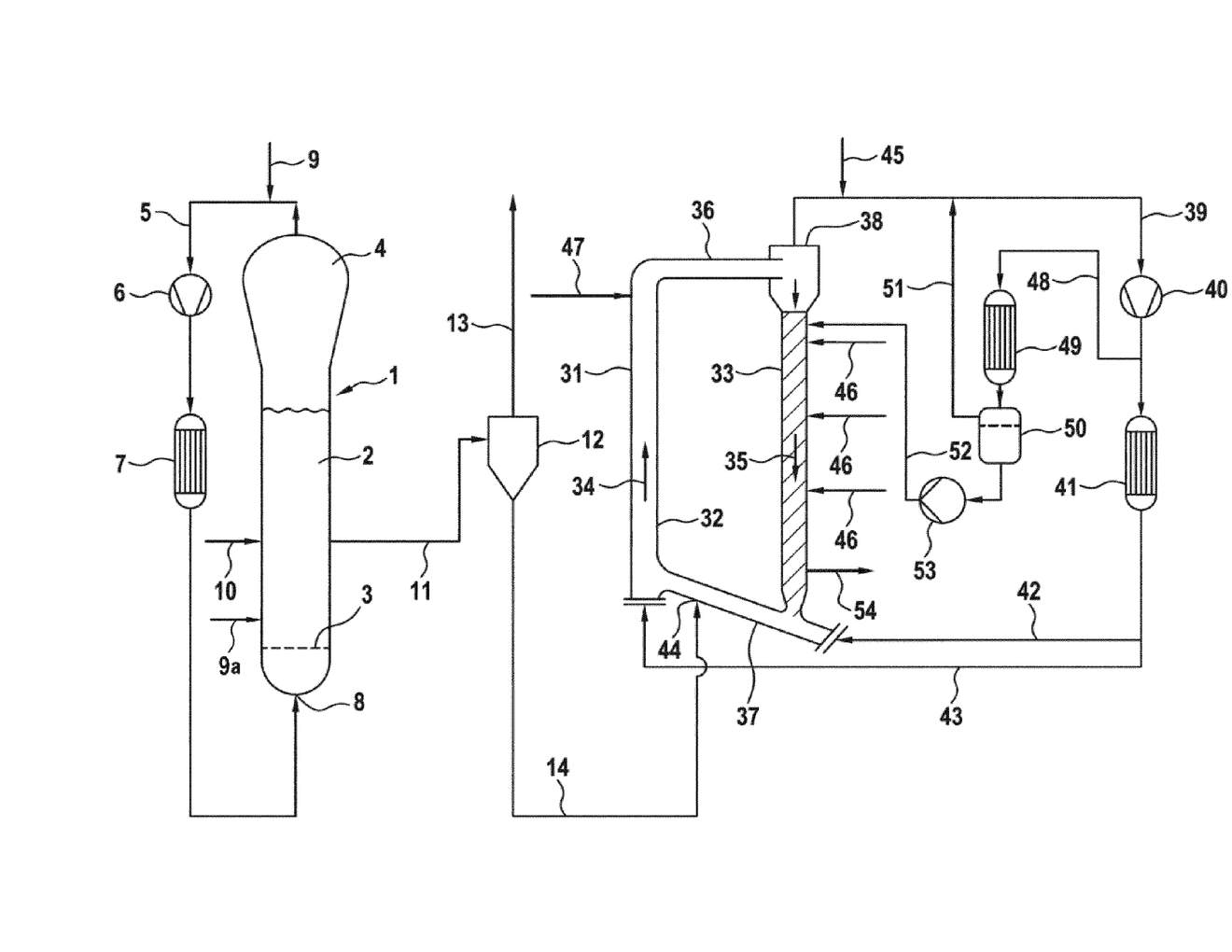
FIG. 1 is a schematic of an embodiment of a polymerization reactor cascade including a fluidized-bed reactor and a multizone circulating reactor for a polymerization process disclosed herein.

FIG. 1 is a schematic of an embodiment of a polymerization reactor cascade including a fluidized-bed reactor and a multizone circulating reactor for a polymerization process disclosed herein.

The first gas-phase reactor, fluidized-bed reactor (1), includes a fluidized bed (2) of polyolefin particles, a gas distribution grid (3) and a velocity reduction zone (4). The velocity reduction zone (4) has an increased diameter compared to the diameter of the fluidized-bed portion of the reactor. The polyolefin bed is kept in a fluidization state by an upwardly flow of gas fed through the gas distribution grid (3) placed at the bottom portion of the reactor (1). The gaseous stream of the reaction gas leaving the top of the velocity reduction zone (4) via recycle line (5) is compressed by compressor (6), transferred to a heat exchanger (7), in which the stream is cooled, and then recycled to the bottom of the fluidized-bed reactor (1) at a point below the gas distribution grid (3) at position (8). The recycle gas can be cooled to below the dew point of one or more of the recycle gas components in the heat exchanger so as to operate the reactor with condensed material, which is described herein as in the condensing mode. In some embodiments, the recycle gas includes unreacted monomers, inert condensable gases, and inert non-condensable gases. Make-up monomers, molecular weight regulators, and optional inert gases or process additives can be fed into the reactor (1) at various positions, including one or more lines (9) into recycle line (5) upstream of the compressor (6) or via line (9a) to the polymer bed within fluidized-bed reactor (1. In some embodiments, the catalyst is fed into the reactor (1) via a line (10). In some embodiments, line (10) is placed in the lower part of the fluidized bed (2).

The polyolefin particles obtained in fluidized-bed reactor (1) are discontinuously discharged via line (11) and fed to a solid/gas separator (12). The gas leaving solid/gas separator (12) exits the reactor via line (13) as off-gas while the separated polyolefin particles are fed via line (14) to the second gas-phase reactor.

The second gas-phase reactor is a multizone circulating gas-phase reactor (31) with two reaction zones, riser (32) and downcomer (33), which are repeatedly passed by the polyolefin particles. Within riser (32), the polyolefin particles flow upward under fast fluidization conditions along the direction of arrow (34). Within downcomer (33), the polyolefin particles flow downward under the action of gravity along the direction of arrow (35). The riser (32) and the downcomer (33) are interconnected by the interconnection bends (36) and (37).

After flowing through the riser (32), the polyolefin particles and the gaseous mixture leave the riser (32) and are conveyed to a solid/gas separation zone (38). In some embodiments, the solid/gas separation is effected by a centrifugal separator like a cyclone. From the separation zone (38), the polyolefin particles enter the downcomer (33).

The gaseous mixture leaving the separation zone (38) is recycled to the riser (32) by recycle line (39), equipped with a compressor (40) and a heat exchanger (41). Downstream of the heat exchanger (41), the recycle line (39) splits and the gaseous mixture is divided into two separated streams: line (42) conveys a part of the recycle gas into the interconnection bend (37) while line (43) conveys another part the recycle gas to the bottom of the riser (32), thereby establishing fast fluidization conditions.

The polyolefin particles coming from the first gas-phase reactor via line (14) enter the multizone circulating gas-phase reactor (31) at the interconnection bend (37) in position (44).

In some embodiments, make-up monomers, make-up comonomers, and optionally inert gases or process additives are fed to the multizone circulating reactor (31) via one, two or more lines (45) or (46), placed at a point along the gas recycle line (39) or the downcomer (33). In some embodiments, process additives such as antistatic agents are fed via line (47).

A part of the gaseous mixture leaving the separation zone (38) exits recycle line (39) after the compressor (40) and is sent through line (48) to heat exchanger (49) where the mixture is cooled to a temperature at which the monomers and the optional inert gas are partially condensed. A separating vessel (50) is placed downstream the heat exchanger (49). The separated gaseous mixture is recirculated through line (51) to recycle line (39), and the separated liquid is fed to the downcomer (33) through line (52) by pump (53).

The polyolefin particles obtained in the multizone circulating reactor (31) are continuously discharged from the bottom part of downcomer (33) via discharge line (54).

In some embodiments, the antistatic agent is made from or contains an alkylene oxide derived polymer made from or containing in average from about 10 to about 200 repeating units —($CH_2$—CHR—O)— with R being hydrogen or an alkyl group having from 1 to 6 carbon atoms, wherein the alkylene oxide derived polymer is a random copolymer of ethylene oxide and other alkylene oxides and the ratio of n:m of is in the range of from 6:1 to 1:1, alternatively in the range of from 5:1 to 1.5:1 and alternatively in the range of from 4:1 to 2:1, wherein (n) is the average number of repeating units —($CH_2$—$CH_2$—O)— derived from ethylene oxide and (m) is the average number of repeating units —($CH_2$—CHR'—O)— with R' being an alkyl group having from 1 to 6 carbon atoms derived from the other alkylene oxides and the end groups of the alkylene oxide derived polymer are —OH groups.

In some embodiments, the ethylene oxide derived polymer is a linear polymer of general formula (I)

wherein R' is an alkyl group having from 1 to 6 carbon atoms, alternatively an alkyl group having from 1 to 3 carbon atoms and alternatively methyl, and n is in a range of from 10 to 180, alternatively from 20 to 100 and alternatively from 30 to 50 and m is in a range of from 2 to 120, alternatively from 10 to 80 and alternatively from 10 to 40.

In some embodiments, the antistatic agent is a random copolymer of ethylene oxide and propylene oxide. In some embodiments, the copolymer of ethylene oxide and propylene oxide is a linear ethylene oxide/propylene oxide copolymer of general formula (II)

wherein n is in a range of from 10 to 180, alternatively from 20 to 100 and alternatively from 30 to 50 and m is in a range of from 2 to 120, alternatively from 10 to 80 and alternatively from 10 to 40.

In some embodiments, alkylene oxide derived polymers are prepared by reacting ethylene oxide and the other alkylene oxides, with polyhydric alcohols. In some embodiments, the alkylene oxide is propylene oxide. In some embodiments, the polyhydric alcohols are diols, triols, or polyols. In some embodiments, the diol is ethylene glycol. In some embodiments, the triol is glycerol. In some embodiments, the polyol is pentaerythritol. In some embodiments, the resulting polymers are linear polymers.

In some embodiments, the antistatic agent is fed directly into the reactor or into a line leading to the reactor.

In some embodiments, the amount of antistatic agent introduced into the polymerization reactor is from about 1 to about 500 ppm per weight, alternatively from about 10 to about 200 ppm per weight, and alternatively from about 50 to about 100 ppm per weight, based upon the total weight of the prepared polyolefin.

In some embodiments, the polymerization is a gas-phase polymerization, and the antistatic agent is introduced into the gas-phase polymerization reactor by feeding the antistatic agent to a part of the reactor where the density of solid polymer particles is at least about 30 kg/m$^3$, alternatively at least about 50 kg/m$^3$, and alternatively at least about 80 kg/m$^3$. In some embodiments, the antistatic agent are fed where the reactor a contains a stirred or fluidized bed of polymer particles. In some embodiments, the antistatic agent are fed into a riser or a downcomer of a multizone circulating reactor. In some embodiments, the gas-phase polymerization is preceded by a polymerization in suspension and the antistatic agent is fed into a flash line or flash vessel into which the suspension medium is evaporated.

In some embodiments, the antistatic agent is introduced into the polymerization reactor by a stream of a liquid hydrocarbon. This stream for feeding the antistatic agent can be a monomer or comonomer stream. In some embodiments, this stream is a liquid hydrocarbon. In some embodiments, the stream is referred to as a pick-up stream. In some embodiments, the liquid hydrocarbon is propane or propylene. In some embodiments, the weight ratio of antistatic agent to liquid hydrocarbon in the combined stream, which is introduced into the reactor, is less than 1:5, alternatively in the range from 1:5000 to 1:10, alternatively in the range from 1:2000 to 1:20, and alternatively in the range from 1:1000 to 1:50. In some embodiments, the combined feed stream made from or containing liquid hydrocarbon and antistatic agent does not contain organoaluminum compounds. In some embodiments, the combined feed does not contain aluminum alkyls. In some embodiments, the feed line for introducing the combined feed stream made from or containing liquid hydrocarbon and antistatic agent into the gas-phase polymerization reactor is equipped with a static mixer and the combined feed stream passes the static mixer before being introducing into the gas-phase polymerization reactor.

In some embodiments, the process allows the preparation of a variety of polyolefin polymers. In some embodiments, the prepared polyolefin polymers are broad molecular weight polyolefin polymers. In some embodiments, the broad molecular weight polyolefin polymers are multimodal polyolefin polymers. Herein, the term "multimodal" refers to the modality of the molecular weight distribution and shall include bimodal. In some embodiments, the polymers are obtained from polymerizing olefins in a cascade of two or more polymerization reactors under different reaction conditions. Thus, the "modality" indicates how many different polymerization conditions were utilized to prepare the polyolefin, independently whether this modality of the molecular weight distribution can be recognized as separated maxima in a gel permeation chromatography (GPC) curve or not. In some embodiments and in addition to the molecular weight distribution, the polyolefin polymer can have a comonomer distribution. In some embodiments, the average comonomer content of polymer chains with a higher molecular weight is higher than the average comonomer content of polymer chains with a lower molecular weight. In some embodiments, identical or very similar reaction conditions in all polymerization reactors of the reaction cascade are used, thereby preparing narrow molecular weight or monomodal polyolefin polymers.

In some embodiments, the polymerization is carried out in a cascade of a fluidized-bed reactor and a multizone circulating reactor and the polymerization reactors are operated with different polymerization conditions. In some embodiments, the polymerization is carried out with different concentrations of molecular weight regulator such as hydrogen. In some embodiments, a lower molecular weight polyolefin polymer component is obtained in the polymerization with the lower hydrogen concentration reactor and a higher molecular weight polyolefin polymer component is obtained in the polymerization with the lower hydrogen concentration reactor. In some embodiments, a lower molecular weight polyolefin polymer component is obtained in the fluidized-bed reactor and a higher molecular weight polyolefin polymer component is obtained in the multizone circulating reactor. In some embodiments, the fluidized-bed reactor is operated with a higher concentration of hydrogen producing a lower molecular weight polyolefin polymer component and the multizone circulating reactor is operated with a lower concentration of hydrogen producing a higher molecular weight polyolefin polymer component.

In some embodiments, polyolefin polymers prepared in the process are polyethylenes having a $MFR_{21.6}$ according to DIN EN ISO 1133:2005 at a temperature of 190° C. under a load of 21.6 kg in the range of from about 0.5 g/10 min to about 350 g/10 min, alternatively either in the range of from about 1.0 g/10 min to about 40 g/10 min or from about 120 g/10 min to about 250 g/10 min and alternatively are polyethylenes having a $MFR_{21.6}$ in the range of from about 1.2 g/10 min to about 35 g/10 min and alternatively from about 1.5 g/10 min to about 10 g/10 min. In some embodiments, the density is in the range of from about 0.935 g/cm$^3$ to about 0.970 g/cm$^3$ and alternatively in the range of from about 0.945 g/cm$^3$ to about 0.968 g/cm$^3$.

In some embodiments, the process is for preparing polyethylenes in a polymerization reactor cascade, in which a fluidized-bed reactor is arranged upstream of a multizone circulating reactor, and where an ethylene homopolymer or ethylene copolymer, which has a $MFR_{2.16}$ according to DIN EN ISO 1133:2005 at a temperature of 190° C. under a load of 2.16 kg in the range of from about 0.1 g/10 min to about 300 g/10 min and alternatively from about 1 g/10 min to about 100 g/10 min, is produced in the fluidized-bed reactor.

In some embodiments, the process provides for preparing a polyolefin polymer by gas-phase polymerization in a polymerization reactor cascade including a fluidized-bed reactor and a multizone circulating reactor, in which the formation of polymer agglomerates in the polymerization reactors and fluctuations in the fluid-dynamics of the multizone circulating reactor are prevented or reduced.

In some embodiments, the process reduces the level of electrostatic charges observed in the multizone circulating reactor. In some embodiments, the tendency of the polyolefin polymer particles to stick to the reactor walls is reduced.

In some embodiments, use of the antistatic agent prevents having to use any non-food-contact approved substances to the polymerization.

EXAMPLES

The density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The melt flow rate $MFR_{2.16}$ was determined according to DIN EN ISO 1133:2005, condition D at a temperature of 190° C. under a load of 2.16 kg.

The melt flow rate $MFR_5$ was determined according to DIN EN ISO 1133:2005, condition T at a temperature of 190° C. under a load of 5 kg.

The melt flow rate $MFR_{21.6}$ was determined according to DIN EN ISO 1133:2005, condition G at a temperature of 190° C. under a load of 21.6 kg.

The Flow Rate Ratio FRR is the ratio of $MFR_{21.6}/MFR_5$.

The electrostatic charges present in the second polymerization reactor of the polymerization reactor cascade were measured by a sensor (Correstat 3410; Progression, Inc., Haverhill, Mass., USA), which monitors charge activity and polarity within the reactor. The sensor had a measurement range from +/−0.1 to 10 nA full scale. For the evaluation of the electrostatic charges inside the reactor, the difference between measured negative and positive charges was chosen. The maximum difference was 20 nA and was defined as 100% scale whereas no variation in the electrostatic charge was referred to as 0% scale.

The operability of the second polymerization reactor was classified according to five categories. In one instance, an indication of the operability for specific polymerization conditions was given by density measurements in the multizone circulating reactor. If polymer particles continuously adhered to the walls of the riser, the coverage of the wall increased until the whole layer or a part of the layer dropped at a certain time. As a result, the density of the rector content in the riser increased, a higher polymer mass stream was transported to the downcomer and the polymer particle level within the downcomer increased very fast. The more pronounced these effects were and the more often the effects occurred, the worse was the operability. The sticking and dropping phenomena was observed in the transportation lines of the multizone circulating reactor or at other positions. If a layer of sticking polymer particles was upon a probe for density measurement, the coverage and thickness of the layer influenced the output of the density measurement device. Thus, by monitoring the results of the density measurements at different positions of the polymerization reactor and observing the polymer particle level within the downcomer, the operability of the second polymerization reactor was assessed.

The operability was classified according to the five following categories:
  Very bad operability: Very unstable reactor behavior, which is expected to lead to an unavoidable shut-down within a period of 2 hours.
  Bad operability: Unstable reactor behavior, which is expected to lead to an unavoidable shut-down within a period of 12 hours.
  Moderate operability: Still unstable reactor behavior but is not expected to lead to a shut-down.

Good operability: Stable reactor behavior with minor fluctuations.

Very good operability: Stable reactor behavior without fluctuations.

The productivity was determined as the amount of obtained polymer per amount of catalyst fed to the polymerization.

Comparative Example A

A polyethylene was prepared in a cascade of a fluidized-bed reactor and a multizone circulating reactor having two interconnected reaction zones, according to an embodiment as depicted in FIG. 1.

For carrying out the polymerization, 7 g/h of a Ziegler-Natta catalyst, which was prepared according to example 13 of Patent Cooperation Treaty Publication No. WO 2004/106388 A2, incorporated herein by reference, with a molar feed ratio of electron donor/Ti of 8, were fed using 5 kg/h of liquid propane to a first stirred precontacting vessel, into which also triethylaluminum (TEA) and tetrahydrofuran (THF) were dosed. The weight ratio of triethylaluminum to the Ziegler catalyst was 6:1. The weight ratio of TEA to THF was 44. The first precontacting vessel was kept at 50° C. with an average residence time of 10 minutes. The catalyst suspension of the first precontacting vessel was continuously transferred to a second stirred precontacting vessel, which was operated with an average residence time of 60 minutes and kept also at 50° C. The catalyst suspension was then transferred continuously to fluidized-bed reactor (FBR) (1) via line (10).

In fluidized-bed reactor (1), ethylene was polymerized in the presence of propane as inert diluent using hydrogen as molecular weight regulator. 40 kg/h of ethylene and 95 g/h of hydrogen were fed to fluidized-bed reactor (1) via line (9). No comonomer was added. The polymerization was carried out at a temperature of 80° C. and a pressure of 2.9 MPa. The selected feed rates resulted in an ethylene concentration in the reactor of 10 vol.-% and a molar ratio of hydrogen/ethylene in the reactor of 1.5. Furthermore, 80 ppm of Atmer 163 (synthetic ethoxylated amine of Croda GmbH, Nettetal, Germany) were fed as antistatic agent to the first reactor via a further line (9) into recycle line (5), employing a feed stream of liquid propane. The amount of added antistatic agents was calculated as weight ratio of the weight of added antistatic agent to the weight of ethylene fed to the first reactor.

The polyethylene obtained in fluidized-bed reactor (1) had a $MFR_{2.16}$ of 20 g/10 min and a density of 0.966 g/cm3.

The polyethylene obtained in fluidized-bed reactor (1) was continuously transferred to multizone circulating reactor (MZCR) (31) which was operated at a pressure of 2.5 MPa and a temperature of 78° C. measured at the gas exit from reactor (31). 14 kg/h of ethylene and 0.95 kg/h of 1-hexene were introduced into downcomer (33) via lines (46) and 5 kg/h of propane, 28.5 kg/h of ethylene and 7.6 g/h of hydrogen were fed into the recycling line (39) via line (45). The selected polymerization conditions resulted in a molar ratio of hydrogen/ethylene in line (43) of 0.2. The multizone circulating reactor (31) was operated by establishing different conditions of monomers and hydrogen concentration within riser (32) and the downcomer (33), which was achieved by feeding 330 kg/h of a liquid stream of partially condensed recycle gas via line (52) into the upper part of the downcomer (33). Heat exchanger (49) was operated at 52° C. and 2.5 MPa. Furthermore, 90 ppm of Atmer 163 and 20 ppm of Cithrol GMS 40-PW-(GD) (glycerol monostearate of Croda GmbH, Nettetal, Germany) were fed to the riser (32) of the multizone circulating reactor (31) via line (47), employing a feed stream of liquid propane. The amounts of antistatic agents added to the second reactor were calculated as weight ratio of the weight of added antistatic agent to the sum of the weight of ethylene fed to the first reactor and the weight of the ethylene fed to the second reactor.

The portion produced in the first reactor of the total amount of the final polyethylene polymer produced in both the first and the second polymerization reactor was 49% by weight. The polyethylene polymer had a final $MFR_{21.6}$ of 7 g/10 min and a FRR of 20. The density was 0.950 g/cm³.

The results of the measured electrostatic charges and the observed operability are shown in Table 1.

Comparative Example B

In the cascade of a fluidized-bed reactor and a multizone circulating reactor used in Comparative Example A, a polyethylene grade differing in the composition from that of Comparative Example A was prepared, whereby the polyethylene obtained in the first polymerization reactor had a lower melt flow rate that the polyethylene obtained in the first polymerization reactor of Comparative Example A.

For carrying out the polymerization, 8 g/h of a Ziegler-Natta catalyst, which was prepared according to example 13 of Patent Cooperation Treaty Publication No. WO 2004/106388 A2, incorporated herein by reference, with a molar feed ratio of electron donor/Ti of 8, were fed using 5 kg/h of liquid propane to a first stirred precontacting vessel, into which also triethylaluminum (TEA) and tetrahydrofuran (THF) were dosed. The weight ratio of triethylaluminum to the Ziegler catalyst was 6:1. The weight ratio of TEA to THF was 44. The first precontacting vessel was kept at 50° C. with an average residence time of 10 minutes. The catalyst suspension of the first precontacting vessel was continuously transferred to a second stirred precontacting vessel, which was operated with an average residence time of 60 minutes and kept also at 50° C. The catalyst suspension was then transferred continuously to fluidized-bed reactor (FBR) (1) via line (10).

In fluidized-bed reactor (1), ethylene was polymerized in the presence of propane as inert diluent using hydrogen as molecular weight regulator. 50 kg/h of ethylene and 90 g/h of hydrogen were fed to fluidized-bed reactor (1) via line (9). No comonomer was added. The polymerization was carried out at a temperature of 80° C. and a pressure of 2.9 MPa. The selected feed rates resulted in an ethylene concentration in the reactor of 11 vol.-% and a molar ratio of hydrogen/ethylene in the reactor of 1.1. Furthermore, 80 ppm of Atmer 163 were fed as antistatic agent to the first reactor via a further line (9) into recycle line (5), employing a feed stream of liquid propane. The amount of added antistatic agents was calculated as weight ratio of the weight of added antistatic agent to the weight of ethylene fed to the first reactor.

The polyethylene obtained in fluidized-bed reactor (1) had a $MFR_{2.16}$ of 5 g/10 min and a density of 0.963 g/cm³.

The polyethylene obtained in fluidized-bed reactor (1) was continuously transferred to multizone circulating reactor (MZCR) (31) which was operated at a pressure of 2.5 MPa and a temperature of 78° C. measured at the gas exit from reactor (31). 20 kg/h of ethylene and 0.2 kg/h of 1-hexene were introduced into downcomer (33) via lines (46) and 5 kg/h of propane, 32.8 kg/h of ethylene and 8 g/h of hydrogen were fed into the recycling line (39) via line (45). The selected polymerization conditions resulted in a molar ratio of hydrogen/ethylene in line (43) of 0.25. The multizone circulating reactor (31) was operated by establishing different conditions of monomers and hydrogen concentration within riser (32) and the downcomer (33), which was achieved by feeding 330 kg/h of a liquid stream of partially condensed recycle gas via line (52) into the upper part of the downcomer (33). Heat exchanger (49) was operated at 52° C. and 2.5 MPa. Furthermore, 90 ppm of Atmer 163 and 20 ppm of Cithrol GMS 40-PW-(GD) were fed to the riser (32) of the multizone circulating reactor (31) via line (47), employing a feed stream of liquid propane. The amounts of antistatic agents added to the second reactor were calculated as weight ratio of the weight of added antistatic agent to the sum of the weight of ethylene fed to the first reactor and the weight of the ethylene fed to the second reactor.

The portion produced in the first reactor of the total amount of the final polyethylene polymer produced in both the first and the second polymerization reactor was 49% by weight. The polyethylene polymer had a final $MFR_{21.6}$ of 2.6 g/10 min and a FRR of 26. The density was 0.953 g/cm$^3$.

The results of the measured electrostatic charges and the observed operability are shown in Table 1.

After running the polymerization of Comparative Example B for a period of 3 days, the reactors were opened and the recycle lines (5) and (39) were inspected. Both recycle lines were found to be clean.

Example 1

The polymerization of Comparative Example B was repeated; however, 100 ppm of Polyglykol PE-K 270 (linear random ethylene oxide/propylene oxide copolymer having a ratio ethylene oxide/propylene oxide of 3:1 and started by a diol of Clariant SE, Frankfurt, Germany) were fed to the first reactor as antistatic agent instead of 80 ppm of Atmer 163. Liquid propane of a flow rate of 5 kg/h was utilized as feed stream for introducing the Polyglykol PE-K 270 into the first reactor. Furthermore, 50 ppm of Polyglykol PE-K 270 were fed to the second reactor as antistatic agent instead of 90 ppm of Atmer 163 and 20 ppm of Cithrol GMS 40-PW-(GD). Liquid propane of a flow rate of 5 kg/h was utilized as feed stream for introducing the Polyglykol PE-K 270 into the second reactor. Moreover, the catalyst feed to the first reactor was reduced to 6.7 g/h in order to have the same ethylene concentration in the fluidized bed reactor as in Comparative Example B.

The obtained polyethylene polymer had a final $MFR_{21.6}$ of 2.6 g/10 min and a FRR of 26. The obtained density was 0.953 g/cm$^3$.

The results of the measured electrostatic charges and the observed operability are shown in Table 1.

After running the polymerization of Example 1 for a period of 3 days, the reactors were opened and the recycle lines (5) and (39) were inspected. Recycle line (39) was found to be clean while recycle line (5) was found to be covered with a sticky wall layer made from or containing PE-K 270 and polyethylene particles.

Example 2

The polymerization of Example 1 was repeated; however, antistatic agent Polyglykol PE-K 270 was fed to the polymer bed of the first reactor via line (9a). Liquid propane of a flow rate of 5 kg/h was utilized as feed stream for introducing the Polyglykol PE-K 270 into the first reactor.

The obtained polyethylene polymer had a final $MFR_{21.6}$ of 2.6 g/10 min and a FRR of 26. The density was 0.953 g/cm$^3$.

The results of the measured electrostatic charges and the observed operability are shown in Table 1.

After running the polymerization of Example 2 for a period of 3 days, the reactors were opened and the recycle lines (5) and (39) were inspected. Both recycle lines were found to be clean.

TABLE 1

|  | Comp. Example A | Comp. Example B | Example 1 | Example 2 |
| --- | --- | --- | --- | --- |
| (A) First reactor (FBR) | | | | |
| Electrostatics [%] | 95 | 95 | 10 | 10 |
| (B) Second reactor (MZCR) | | | | |
| Electrostatics [%] | 35 | 85 | 20 | 20 |
| Operability | good | moderate | very good | very good |
| Chunks or wall sheeting | no | no | no | no |
| Productivity [%] | 11600 | 12500 | 15000 | 15000 |

The invention claimed is:

1. A process for preparing a polyolefin comprising:
  (a) polymerizing olefins at temperatures of from about 20 to about 200° C. and pressures of from about 0.1 to 20 MPa in the presence of a polymerization catalyst in a polymerization reactor,
  wherein the polymerization is carried out in the presence of an antistatic agent comprising
    (i) an alkylene oxide derived polymer comprising
      (A) an average of 10 to 200 repeating units of the formula —($CH_2$—CHR—O)—, with R being hydrogen or an alkyl group having from 1 to 6 carbon atoms,
      wherein the alkylene oxide derived polymer comprises
      (1) a random copolymer of ethylene oxide and other alkylene oxides and
      (2) a ratio of n:m in the range of from 6:1 to 1:1, wherein n is the average number of repeating units of the formula —($CH_2$—$CH_2$—O)— derived from ethylene oxide and m is the average number of repeating units —($CH_2$—CHR'—O)— derived from the other alkylene oxides, wherein R' comprises an alkyl group having from 1 to 6 carbon atoms and end groups of the alkylene oxide derived polymer are —OH groups.

2. The process of claim 1, wherein the ratio of n:m is in the range of 2:1 to 4:1.

3. The process of claim 1, wherein the alkylene oxide derived polymer is a linear polymer of the general formula (I):

$$HO-(CH_2-CH_2-O)_n-(CH_2-CHR'-O)_m-H \qquad (I)$$

wherein R' is a alkyl group having from 1 to 6 carbon atoms, and n is in a range of from 10 to 180 and m is in a range of from 2 to 120.

4. The process of claim 1, wherein the alkylene oxide derived polymer is a random copolymer of ethylene oxide and propylene oxide.

5. The process of claim 4, wherein the ethylene oxide/propylene oxide polymer is a linear ethylene oxide/propylene oxide copolymer of the general formula (II):

$$HO-(CH_2-CH_2-O)_n-(CH_2-CH(CH_3)-O)_m-H \quad (II)$$

wherein n is in a range of from 10 to 180 and m is in a range of from 2 to 120.

6. The process of claim 1, wherein the polymerization is a gas-phase polymerization and the antistatic agent is introduced into the gas-phase polymerization reactor by feeding the antistatic agent to a part of the reactor where the density of solid polymer particles is at least about 30 kg/m³.

7. The process of claim 1, wherein the antistatic agent is introduced into the polymerization reactor by a feed stream of a liquid hydrocarbon and the weight ratio of the antistatic agent to the liquid hydrocarbon in the combined stream introduced into the reactor is in the range from 1:10 to 1:5000.

8. The process of claim 1, wherein the polymerization is carried out in a polymerization reactor cascade comprising
(I) a fluidized-bed reactor; and
(II) a multizone circulating reactor,
wherein in the multizone circulating reactor, the growing polymer particles flow upward through a first polymerization zone under fast fluidization or transport conditions, leave the first polymerization zone and enter a second polymerization zone through which the particles flow downward under the action of gravity, leave the downcomer and are reintroduced into the riser, thereby establishing a circulation of polymer, and the fluidized-bed reactor is arranged upstream of the multizone circulating reactor.

9. The process of claim 1, wherein the polymerization is carried out in a polymerization reactor cascade comprising
(I) a fluidized-bed reactor; and
(II) a multizone circulating reactor,
wherein a lower molecular weight polyolefin polymer component is obtained in the fluidized-bed reactor and a higher molecular weight polyolefin polymer component is obtained in the multizone circulating reactor.

10. The process of claim 1, wherein the polyolefin is a multimodal polyolefin.

11. The process of claim 1, wherein the polyolefin is a polyethylene prepared by homopolymerizing ethylene or copolymerizing ethylene and up to about 20 wt. % of $C_3$-$C_8$ 1-alkenes, based upon the total weight of the polyethylene.

12. The process of claim 11, wherein the polyethylene has a $MFR_{21.6}$ according to DIN EN ISO 1133:2005 at a temperature of 190° C. under a load of 21.6 kg in a range of from about 0.5 g/10 min to about 350 g/10 min.

13. The process according to claim 11, wherein the polyethylene has a density in the range of from about 0.935 g/cm³ to about 0.970 g/cm³.

14. The process of claim 11, wherein the polyethylene is prepared in a polymerization reactor cascade, comprising
(I) a fluidized-bed reactor; and
(II) a multizone circulating reactor,
wherein
(a1) the fluidized-bed reactor is arranged upstream of the multizone circulating reactor, and (a2) the polyethylene is an ethylene homopolymer or ethylene copolymer, having a $MFR_{2.16}$ according to DIN EN ISO 1133:2005 at a temperature of 190° C. under a load of 2.16 kg in a range of from about 0.1 g/10 min to about 300 g/10 min, is produced in the fluidized-bed reactor.

15. The process of claim 1, wherein the polymerization catalyst is selected from the group consisting of a Ziegler catalyst, a Ziegler-Natta catalyst, a Phillips catalyst, a single-site catalyst and a mixture of catalysts comprising a single-site catalyst.

16. A process for the preparation of polyolefins by polymerizing olefins at temperatures of from 20 to 200° C. and pressures of from 0.1 to 20 MPa in the presence of a polymerization catalyst in a polymerization reactor, wherein the polymerization is carried out in the presence of an antistatic agent comprising an alkylene oxide derived polymer comprising an average of 10 to 200 repeating units of the formula —($CH_2$—CHR—O)—, wherein R comprises hydrogen or an alkyl group having from 1 to 6 carbon atoms, wherein the alkylene oxide derived polymer is a random copolymer of ethylene oxide and other alkylene oxides and a ratio n:m of repeating units of the formula —($CH_2$—$CH_2$—O)— derived from ethylene oxide to repeating units —($CH_2$—CHR'—O)— derived from the other alkylene oxides, wherein R' comprises an alkyl group having from 1 to 6 carbon atoms is in a range of from 1:1 to 6:1, and all end groups of the alkylene oxide derived polymer are —OH groups, and wherein the antistatic agent is introduced into the polymerization reactor by a feed stream of a liquid hydrocarbon and the weight ratio of the antistatic agent to the liquid hydrocarbon in the combined stream introduced into the reactor is in a range from 1:10 to 1:5000.

17. The process of claim 16, wherein the alkylene oxide derived polymer is a linear polymer of the general formula (I):

$$HO-(CH_2-CH_2-O)_n-(CH_2-CHR'-O)_m-H \quad (I)$$

wherein R' comprises an alkyl group having from 1 to 6 carbon atoms, and n and m are the average number of repeating units, wherein n is in a range of from 10 to 180 and m is in a range of from 2 to 120.

18. The process of claim 16, wherein the alkylene oxide derived polymer is a random copolymer of ethylene oxide and propylene oxide.

19. The process of claim 16, wherein the polymerization is carried out in a polymerization reactor cascade comprising a fluidized-bed reactor and a multizone circulating reactor, and in the multizone circulating reactor the growing polymer flows upward through a first polymerization zone under fast fluidization or transport conditions, leaves said first polymerization zone and enter a second polymerization zone through which the particles flow downward under the action of gravity, leaves said downcomer and are reintroduced into the riser, thus establishing a circulation of polymer, and the fluidized-bed reactor is arranged upstream of the multizone circulating reactor.

20. The process of claim 16, wherein the polyolefin polymer is a polyethylene prepared by homopolymerizing ethylene or copolymerizing ethylene and up to 20 wt. % of $C_3$-$C_8$ 1-alkenes.

* * * * *

UNITED STATES PATENT AND TRADEMARK OFFICE
CERTIFICATE OF CORRECTION

PATENT NO. : 9,932,465 B1
APPLICATION NO. : 15/560424
DATED : April 3, 2018
INVENTOR(S) : Mannebach et al.

It is certified that error appears in the above-identified patent and that said Letters Patent is hereby corrected as shown below:

In the Specification

In Column 3, Line 27, delete "ethylnorbomadiene" and insert -- ethylnorbornadiene --

In Column 4, Line 54, delete "Ti(OC$_2$H$_5$)$_2$Cl$_2$," and insert -- Ti(OC$_2$H$_5$)$_2$C$_{12}$, --

In Column 4, Line 54, delete "Ti(O-n-C$_4$H$_9$)$_2$Cl$_2$," and insert -- Ti(O-n-C$_4$H$_9$)$_2$C$_{12}$, --

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*